3 Sheets--Sheet 1.

C. H. PERKINS & C. E. SHERIDAN.
Improvement in Machines for Finishing Horse-Shoe Nails.
No. 131,967. Patented Oct. 8, 1872.

Witnesses
S. N. Piper
L. N. Möller

Charles H. Perkins
Charles E. Sheridan
by their attorney
R. H. Eddy

3 Sheets--Sheet 2.

C. H. PERKINS & C. E. SHERIDAN.
Improvement in Machines for Finishing Horse-Shoe Nails.
No. 131,967. Patented Oct. 8, 1872.

Witnesses.
S. N. Piper
L. N. Möller

Charles H. Perkins.
Charles E. Sheridan.
by their attorney
R. Mudy

3 Sheets--Sheet 3.
C. H. PERKINS & C. E. SHERIDAN.
Improvement in Machines for Finishing Horse-Shoe Nails.
No. 131,967. Patented Oct. 8, 1872
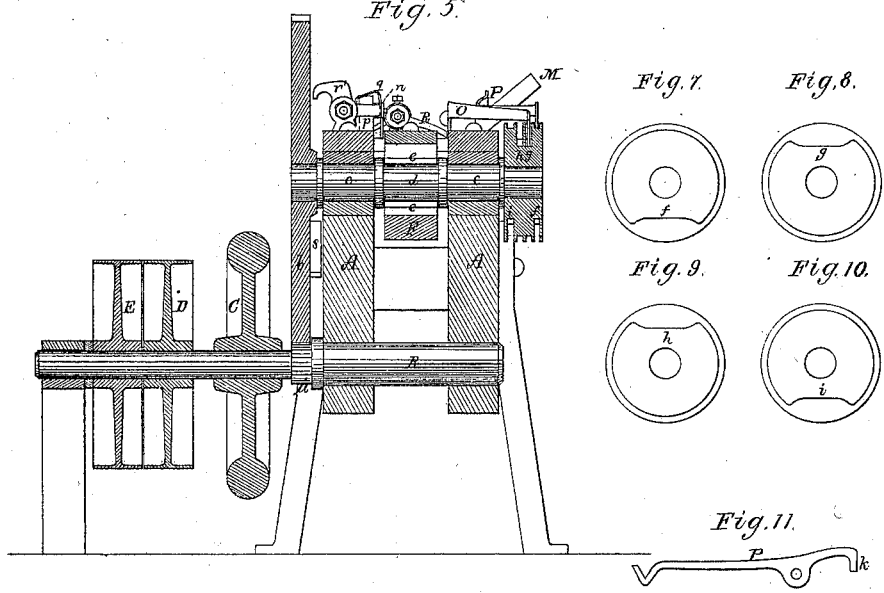
Witnesses.
S. N. Piper
L. W. Möller
Charles H. Perkins.
Charles E. Sheridan.
by their attorney
R. H. Eddy

UNITED STATES PATENT OFFICE.

CHARLES H. PERKINS AND CHARLES E. SHERIDAN, OF PROVIDENCE, R. I., ASSIGNORS TO AMERICAN HORSE-NAIL COMPANY, OF SAME PLACE.

IMPROVEMENT IN MACHINES FOR FINISHING HORSESHOE-NAILS.

Specification forming part of Letters Patent No. 131,967, dated October 8, 1872.

*To all whom it may concern:*

Be it known that we, CHARLES H. PERKINS and CHARLES E. SHERIDAN, of the city and county of Providence, of the State of Rhode Island, have invented a new and useful Machine for Finishing or Flattening Horseshoe-Nails or other articles of like character; and we do hereby declare such machine to be fully described in the following specification and represented in the accompanying drawing, of which—

Figure 1:
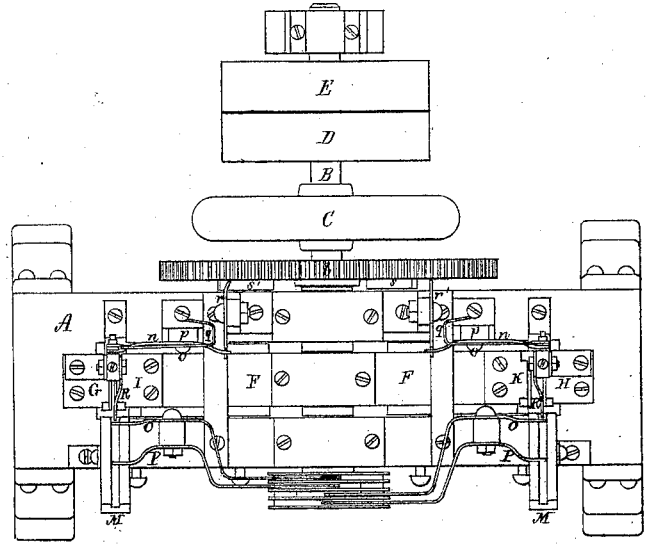
Figure 4:
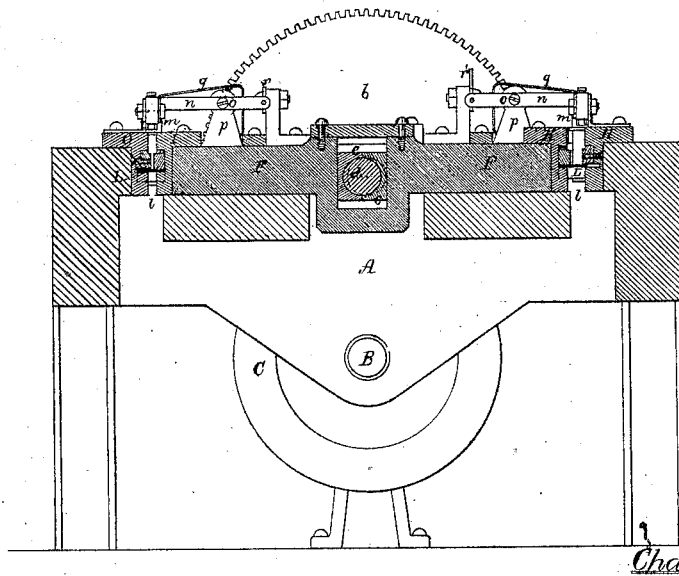
Figure 2:
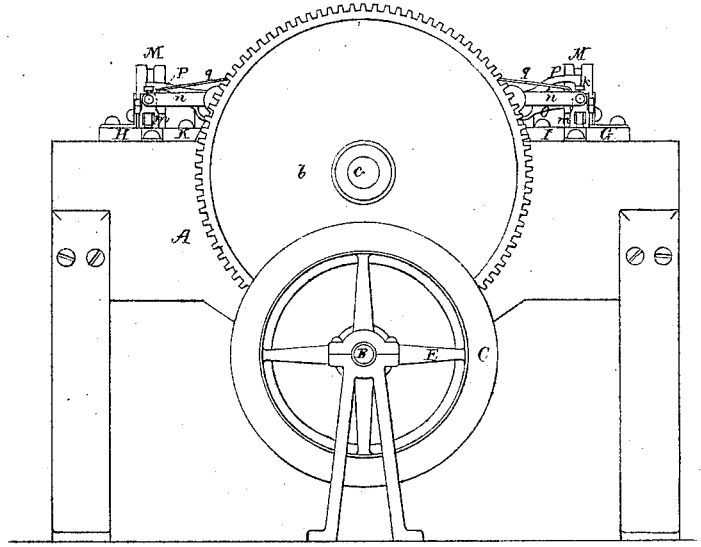
Figure 3:
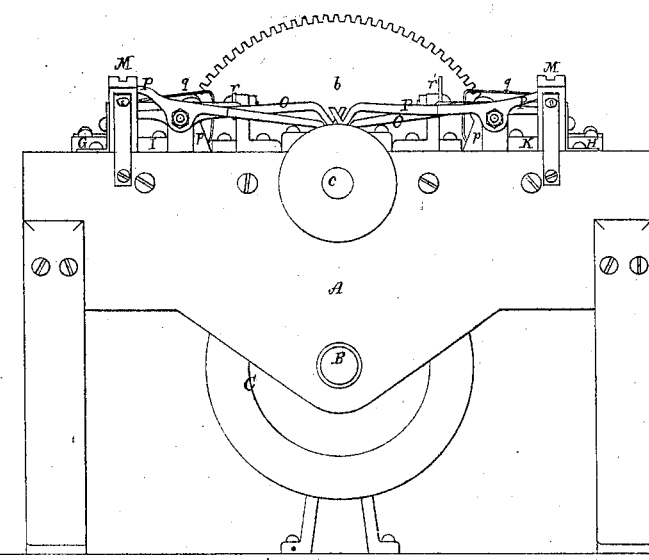

Figure 1 is a top view; Fig. 2, one side elevation; Fig. 3, another side elevation; Fig. 4, a longitudinal section; Fig. 5, a transverse section of the machine, taken through its middle; and Fig. 6 is a transverse section taken through one of the feeding-spouts.

By this machine a horseshoe-nail, (made in the ordinary way by another machine or by hand,) whether it be what is termed a "cut nail" or a wrought nail, may be compressed on two opposite faces, sides, or edges, it being during each compression reduced on two sides or two edges only. The machine as represented is a duplex one, it having a single reciprocating die-carrier provided with dies at its opposite ends. In the machine, as shown, there are advantages over two separate single machines, having disconnected die-carriers and separate operative mechanism therefor. Some of these advantages are economy of space, material, and mechanism, and, furthermore, the ability of one attendant to supply the spouts of both of the feeding mechanisms with the nails.

In the drawing, A denotes the frame of the machine, provided with a driving-shaft, B, arranged as shown, such shaft having a fly-wheel, C, a fast pulley, D, and a loose pulley, E, all as shown. A spur-pinion, $a$, fixed on the driving-shaft engages with a gear, $b$, fixed on a secondary shaft, $c$, extending across the frame A. At the middle of the shaft $c$ there is an eccentric, $d$, which works in a slide-box, $e$, arranged to slide vertically within the movable die-carrier F, so applied to the frame A as to be capable of sliding rectilinearly and longitudinally therein, the carrier when in operation having a reciprocating motion, first being moved toward one stationary die and next toward the other. The said stationary dies, duly supported in the frame, are shown at G and H, the movable dies I and K being fixed to opposite ends of the carrier. Furthermore, there extends from each end of the carrier a shelf or abutment, L, upon which the nail falls, and by which it is supported preparatory to and while being squeezed or compressed. To each pair of dies there is a chute or inclined spout arranged upon the frame A, in manner as shown at M M, there being to each spout two bent levers, O P. Their shorter arms or projections therefrom extend into the spout, while their longer arms rest on cams fixed upon the secondary shaft. These cams are shown at $f$, $g$, $h$, and $i$, vertical sections of them being exhibited in Figs. 7, 8, 9, and 10, with diametric lines on them to indicate their positions in the machine, such lines being in one plane when the cams are fixed to the shaft, the said abutment being properly recessed or made to receive and support the nail at its shank, or at such and the head. A movable stop, $t'$, is used with the bed L, as shown in Figs. 6 and 15, to hold the nail in place preparatory to the operation of the movable die upon it. This stop is raised out of the way when the long arm of lever R descends to throw the nail out from between the dies, after having been subjected to their action. One lever of each pair of the levers is usually on the bottom of the spout, while the other is raised above it, they being moved alternately.

Fig. 11 is a side view of one of such levers, it being shown as constructed with a tooth or extension, $k$, to enter the spout.

A nail on being fed into the spout will stop against the tooth of the upper lever, which subsequently rises to allow the nail by gravity to slide down the spout and bring up against the tooth of the lower lever. Next, this latter tooth rises at the proper time to allow the nail to pass under it and into the space between the dies and fall upon the shelf or abutment L. By having to each feeding-spout two levers raised alternately and intermittently two nails may be in the spout, and yet only one of them at a time will be discharged therefrom into the space between the dies. Immediately after such discharge of a nail the lower lever will descend to the bottom of the spout, and the upper lever will rise and allow a nail previously supported by it to fall down into the space between the two levers or their teeth, ready at the proper time to be discharged into the space between the dies. It is stopped between the dies by the arm $l'$ of the stirrup $m$. (See Figs. 6 and 15.) An attendant will only have to keep the upper part of the spout supplied with a nail. Leading from each pair of dies and down through the frame is a discharge passage or space, $l$, into which the nail, after having been compressed, is forced by a discharge or bent lever, R, arranged and formed, as shown. The shorter arm of the said lever enters a stirrup, $m$, pivoted to one arm of a lever, $n$, having its fulcrum $o$ supported by a standard, $p$, all being arranged as shown. To each of the levers $n$ there is a spring, $q$, for forcing it and the stirrup downward, and thereby moving the discharging-lever back to place out of the space between the dies. This arrangement is clearly shown in Fig. 15. Each of the levers $n$ is pivoted to one of two levers, $r\ r'$, arranged at or about at a right angle with such levers $n\ n$.

Figs. 12 and 13 are side views of the levers $r\ r'$, while Fig. 14 is an inner-side view of the gear $b$ with the two cams $s\ s'$ for actuating the levers $r\ r'$, the said cams being formed and arranged in manner as shown. While the said gear may be revolving, each lever $r$ or $r'$ will be moved at the proper time by its actuating cam, and will move the lever $n$ connected with it. While one pair of dies may be used to flatten the nail on two opposite sides, the other pair may be for compressing it on two opposite edges, so as to give it the requisite taper and point, the dies serving to remove the burs and projections of the nail and to impart to it smoothness of surface to enable it to be driven to good advantage.

We would also remark that both sets of dies may be for flattening the nail on either the opposite sides or edges. The machine may be made to flatten a nail on its sides in one pair of dies and on its edges in the other pair. The nails, after being side flattened, may be received into a spout and by it be discharged or taken to a convenient position to be seized by the attendant and introduced into the spout of the edging-die.

We claim—

In the said machine, the combination of the feeding-spout M, its two levers O P, the stationary and movable dies G I or K H, the shelf or abutment L, and the nail-discharger R and stop $l'$, all being arranged as described, and, with the exception of the spout, the stationary die, and the shelf, being provided with mechanism for operating them, substantially as set forth.

CHARLES H. PERKINS.
CHARLES E. SHERIDAN.

Witnesses:
HENRY MARTIN,
JOSEPH W. MARTIN.